United States Patent
Gauthier et al.

(10) Patent No.: US 9,169,130 B1
(45) Date of Patent: Oct. 27, 2015

(54) DEVICE TO FILTER THE EFFLUENT OF A SEPTIC TANK

(71) Applicants: Ray Gauthier, Duvall, WA (US); Peter Michel, Woodinville, WA (US)

(72) Inventors: Ray Gauthier, Duvall, WA (US); Peter Michel, Woodinville, WA (US)

( * ) Notice: Subject to any disclaimer, the term of this patent is extended or adjusted under 35 U.S.C. 154(b) by 403 days.

(21) Appl. No.: 13/573,871

(22) Filed: Oct. 11, 2012

(51) Int. Cl.
| | |
|---|---|
| C02F 1/44 | (2006.01) |
| C02F 1/00 | (2006.01) |
| B01D 65/02 | (2006.01) |
| C02F 3/12 | (2006.01) |
| B01D 63/10 | (2006.01) |
| C02F 3/06 | (2006.01) |

(52) U.S. Cl.
CPC ............... *C02F 1/006* (2013.01); *B01D 65/02* (2013.01); *C02F 3/1242* (2013.01); *B01D 63/10* (2013.01); *B01D 2315/06* (2013.01); *B01D 2321/04* (2013.01); *B01D 2321/185* (2013.01); *C02F 1/444* (2013.01); *C02F 3/06* (2013.01)

(58) Field of Classification Search
None
See application file for complete search history.

(56) References Cited

U.S. PATENT DOCUMENTS

| | | | | |
|---|---|---|---|---|
| 579,069 | A | * | 3/1897 | Miller et al. ................. 417/108 |
| 3,754,740 | A | * | 8/1973 | Piper ............................ 261/124 |
| 3,923,656 | A | * | 12/1975 | Krebs et al. .................... 210/86 |
| 4,246,114 | A | * | 1/1981 | Krebs et al. ................... 210/151 |
| 4,639,314 | A | * | 1/1987 | Tyer .............................. 210/220 |
| 4,842,736 | A | * | 6/1989 | Bray et al. ............... 210/321.61 |
| 7,585,411 | B2 | * | 9/2009 | Knappe et al. .......... 210/321.69 |
| 7,998,343 | B2 | * | 8/2011 | Aker et al. .................... 210/150 |
| 8,454,829 | B2 | * | 6/2013 | Yaeger .................... 210/321.74 |
| 2006/0219635 | A1 | * | 10/2006 | McCague et al. ............. 210/651 |
| 2007/0068856 | A1 | * | 3/2007 | Chaffee ........................ 210/104 |
| 2009/0223891 | A1 | | 9/2009 | Gauthier |

OTHER PUBLICATIONS

Soltman, J Mark "Integrated Database Washington" Washington State Department of Health (WSDOH) Enviromental Health Programs, Web document, not dated.

* cited by examiner

*Primary Examiner* — Terry Cecil

(57) ABSTRACT

A component filter device which is added to a new or existing multi-chamber septic tank to filter the effluent of the septic tank to improve the quality of the water entering a method of dispersal. The device uses a spiral wound membrane filter to filter the effluent. The membrane filter contains open channel spacers to channel the bubbles which scour the membrane leaves. An air lift pump is used to pump permeate. A three-way actuator valve directs the airflow to either the pump or to a bubble diffuser. A two-way actuator valve directs the flow of permeate. A low water indicator directs the operation of the device. The device uses bubble scouring and back washing to clean the membrane leaves. A blower, two actuator valves and a low water indicator are the only moving parts of the device.

1 Claim, 3 Drawing Sheets

DEVICE TO FILTER THE EFFLUENT OF A SEPTIC TANK

REFERENCES CITED

| U.S. Patent Documents | | | |
|---|---|---|---|
| 579,069 | 3/1897 | Miller | 417/108 |
| 3,754,740 | 8/1973 | Piper | 261/124 |
| 4,639,314 | 1/1987 | Tyer | 210/220 |
| 4,842,736 | 6/1989 | Bray | 210/321.61 |
| 2009/0223891 | 9/2009 | Gauthier | 210/605 |

OTHER DOCUMENTS

Soltman, J. Mark, and Eliasson, John. "Integrated Database Washington". Washington State Department of Health (WSDOH) Environmental Health Programs.

FIELD OF THE INVENTION

The present invention is a component device for filtering the water produced by a septic tank. The effluent of the device is added to a drain field or other method of dispersal. The device is added to a new or existing septic system.

BACKGROUND OF THE INVENTION

Effluent from septic systems may no longer meet the new water quality emission standards now in force in various municipalities and other governmental jurisdictions. It is advantageous to have an economical and reliable solution to bring existing or new septic systems into conformity with the new water quality release standards. Energy is becoming increasingly expensive, so a filtration system should be as energy efficient as possible. Alternatively, drain fields often fail due to overloading. It is advantageous to have an economical and reliable solution for the remediation of failed systems.

DESCRIPTION OF PRIOR ART

According to the Washington State Department of Ecology the estimated rate of failure for septic systems ranges from a high estimate of over one third to a low estimate of 3% of all septic systems depending on the definition of "failure". "To be defined as failing, the system must pose a clear public health hazard or nuisance; direct or indirect contact between sewage and the public." according to the Washington State Department of Ecology.

A septic tank in combination with a drain field or other means of dispersal provide the waste water treatment for most homes not connected to a sewer system. The alternatives to a drain field include ponds, trickle filters, fiber filters, peat moss beds, pressurized mounds, leach fields or open ditches. The septic tank has one or more chambers and anaerobically digests the waste water sent to it from the home. Fats, grease and non-soluble solids are retained in the septic tank, to be pumped out later. When the effluent then passes to a drain field, it is aerobically digested by microorganisms in the soil. A drain field requires certain types of soils, soil structures, and groundwater conditions to function properly. The septic system is simple, easy to operate and reliable.

A drain field can over time become overloaded and become less able to digest the septic tank effluent. Cleaning out a drain field is expensive, and after cleaning, accumulating solids will lead to problems in the future. Replacing a drain field is even more expensive than repairing a drain field and it requires additional land which may not be available to the home owner.

There may not be the right soil conditions available for a drain field to properly treat septic tank effluent. Additional pretreatment may be necessary in order for a drain field to meet local environmental treatment rules.

There may be additional restrictions on the use of a septic system due to the proximity of surface water, a sensitive aquifer, or a sensitive environment. Pretreatment of the septic tank effluent before it goes to a drain field may be the only way to meet the higher standards required for discharge into a sensitive environment.

Higher levels of water treatment require more equipment which is expensive and complex. The home owner would like a simple, reliable, inexpensive and easy to operate treatment system. Adding a component to a septic system is more cost effective than replacing the entire system.

Fecal coliform testing is one of the tests of water quality that form the overall water-quality rating in a process used by U.S. EPA. The removal of fecal coliform bacteria from water is important for the protection of human safety. The addition of chemicals to kill the fecal coliform bacteria can bring additional cost and kill the microorganisms in the soil preventing the drain field from catabolizing the water sent to it. The use of high intensity UV light to kill the fecal coliform uses a lot of electricity. A physical barrier such as a membrane filter is another way for reducing the amount of fecal coliform bacteria present in the final water released to the environment.

A home filtration system operates at low water volumes, an electric pump which pumps small volumes of water is often a precision pump. Often a reduction valve is required to restrict the flow leaving the pump. The flow restriction can cause the pump to heat up and shorten the life span of the pump. If the flow rate of the pump exceeds the flow rate of the filter, the pump can run dry and burn out.

The air lift pump; the spiral wound membrane filter, the blower, the bubble diffuser, the actuator valve, the tank, the skirt, the union, and the low water indicator are existing devices.

SUMMARY OF THE INVENTION

The component filter device is added to a new or existing multi-chamber septic tank to filter the influent from the septic tank. The filter device has a process tank which has two chambers. A lower chamber containing influent is covered by a water tight upper chamber. The process tank is covered by a removable exterior lid which contains an air vent.

The lower chamber contains an influent line which is hydraulically connected to and receives influent from the last chamber of a multi-chamber septic tank. The influent line contains a siphon break to prevent the influent from returning to the last chamber of the septic tank when the influent is not being pumped into the process tank. The lower chamber of the process tank contains a return line to return the excess influent to the first chamber of the septic tank. The return line is hydraulically connected to the first chamber of the septic tank. The lower chamber contains a collection pipe. An enclosed air lift pump is hydraulically connected to the base of the collection pipe which is vertically mounted within the lower chamber of the process tank. The enclosed air lift pump pumps permeate inside of the collection pipe. A bubble diffuser to create bubbles to scrub a spiral wound membrane filter from the outside of the membranes is connected to the top of the enclosed air lift pump and surrounds the collection pipe. The enclosed air lift pump and the bubble diffuser form a base for the collection pipe. A spiral wound membrane filter to filter the septic tank influent and reduce the fecal coliform in the filter permeate is hydraulically connected to the collection pipe and is mounted above the bubble diffuser. The filter contains triangular open channel spacers to separate the membrane leaves. The spacers facilitate the flow of bubbles produced by the bubble diffuser to improve the scrubbing of the membrane leaves within the filter. The level of the influent is above the top of the filter and the weight of the water forces the influent through the filter. A skirt to capture the air bubbles made by the bubble diffuser and to channel these bubbles to the base of the filter to clean the filter membranes from the outside is mounted to the base of the spiral wound membrane filter. The collection pipe extends above the spiral wound membrane filter to a union which is hydraulically connected to the collection pipe above the filter. The union allows the collection pipe to separate into two parts so that the filter and the components attached to the collection pipe below the filter can be easily removed. A process tank drain pipe to drain the water out of the lower process tank is connected to the process tank upper chamber; it extends down into the lower chamber to reach just short of the bottom of the process tank. The process tank drain pipe has a removable cap. A low water indicator which sends a signal to a control panel is contained in the lower chamber of the process tank. The low water indicator has a control wire which passes into the upper chamber and into a control panel. The signal from the low water indicator controls the run cycle of the device.

The upper chamber of the process tank contains four compartments and a membrane access lid. The compartments of the upper chamber contain: a control panel, a low pressure high volume blower with a three-way actuator valve, a collection tank, and a two way actuator valve. The control panel is contained in one of the four compartments of the upper chamber; it has both manual and automatic controls for the operation of the filtration device. Another of the four compartments contains the blower and the three way actuator valve. The three-way actuator valve is pneumatically connected to the blower. The three-way actuator valve is pneumatically connected to an airline connecting to the enclosed air lift pump and to an airline connecting to the bubble diffuser. The airline actuator valve distributes the air sent by the blower to either the air lift pump airline or to the bubble diffuser airline. The air lift pump airline passes through the side of the compartment containing the blower and into the lower chamber of the process tank where it is pneumatically connected to the enclosed air lift pump. The bubble diffuser airline passes through the side of the compartment containing the blower into the lower chamber of the process tank where it is pneumatically connected to the bubble diffuser. A collection tank is in one of the four compartments of the upper chamber. The collection tank contains a chemical cleaning port on the top of the collection tank which is hydraulically connected to the collection tank. The chemical cleaning port contains a removable cap. The collection tank is hydraulically connected to the collection pipe after the union. The collection pipe passes through the side of the compartment containing the collection tank to connect with the collection tank. The final compartment of the upper chamber contains a two way actuator valve to control the flow of permeate in the collection tank. The two way actuator valve is hydraulically connected to the side of the collection tank. The two way actuator valve is also hydraulically connected to an effluent line. The effluent line extends through the wall of the compartment and through the wall of the process tank. The effluent line is hydraulically connected to a drain field or other method of dispersal. When the actuator valve is open permeate flows via the effluent line out of the device. When the actuator valve is closed and the enclosed air lift pump is pumping permeate and air are forced out of the collection tank and the collection pipe and out through the membranes leaves of the filter into the lower chamber of the process tank backwashing the filter to clean its membranes from the inside. The upper chamber contains a filter access port to access the filter assembly. The filter access port has a removable filter access lid. The upper chamber of the process tank is covered by a removable exterior lid which has a pneumatically connected air vent.

DETAILED DESCRIPTION OF THE PREFERRED EMBODIMENT AND THE DRAWINGS

Figure 1:
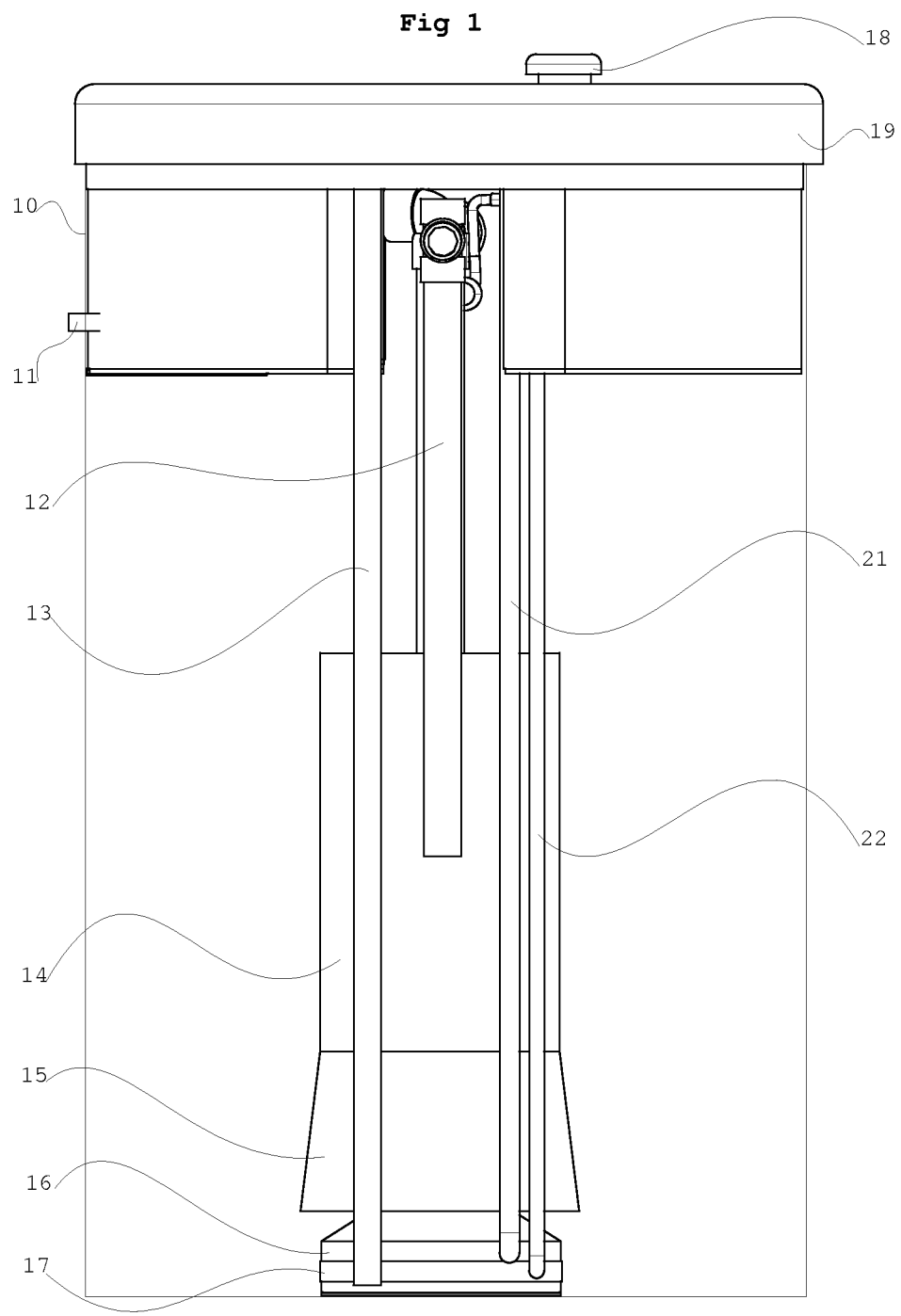
FIG. 1 depicts an interior view from the back side of the process tank.
Figure 2:
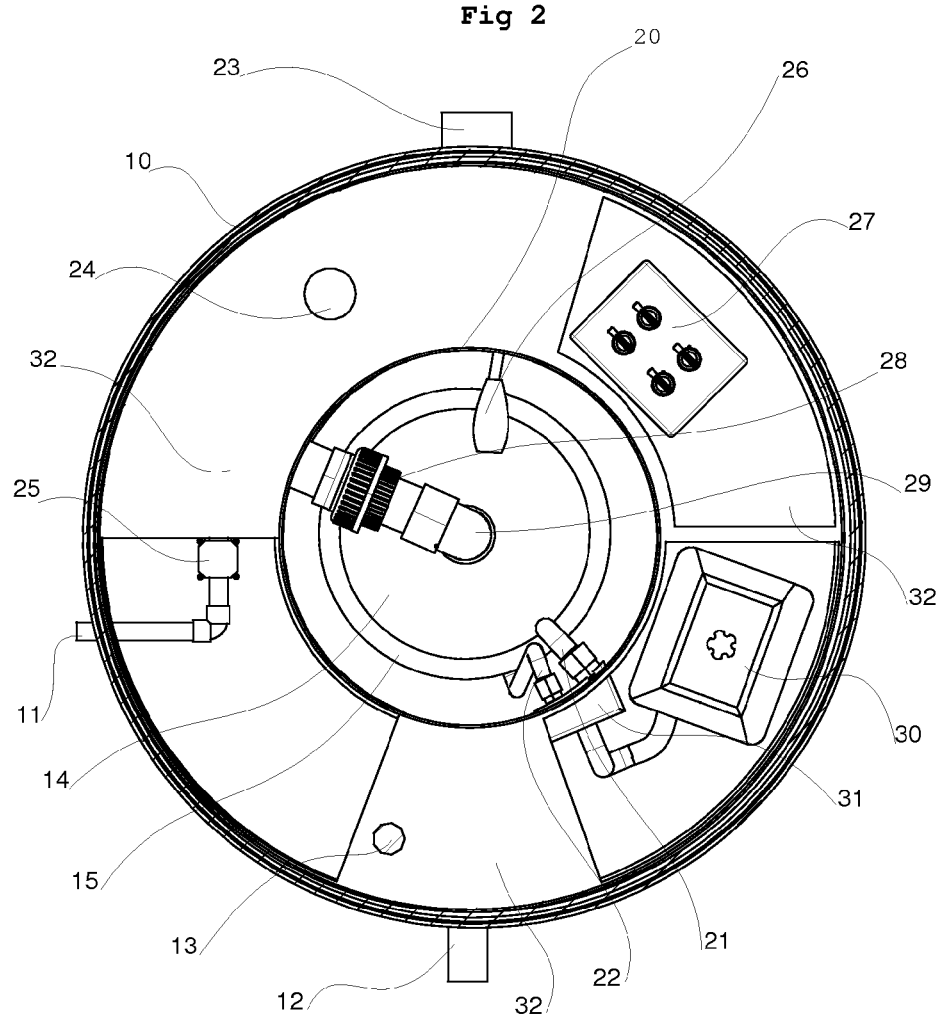
FIG. 2 depicts an aerial cross sectional view from below the filter access lid of the upper chamber of the process tank.
Figure 3:
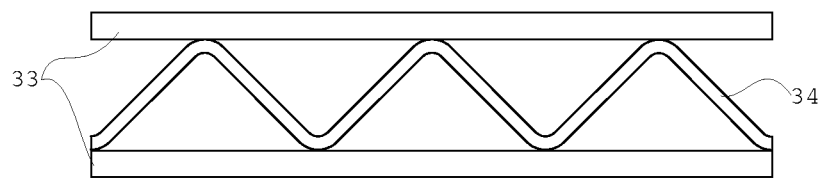
FIG. 3 depicts an aerial view of a portion of two membrane leaves and a portion of a spacer.

The process tank 10 consists of a lower chamber and an upper chamber. The watertight upper chamber 32 contains the filter access port 20. The filter access port 20 has a removable lid.

The lower chamber contains the low water indicator 26 and its attached cord. The low water indicator signals the filtration device when to begin and end the run cycle. The low water indicator cord 26 filter is electrically connected to a connector on the upper chamber 32. The connector is electrically connected to the control panel 27. The lower chamber of the process tank 10 contains the influent line 12 and its siphon break. The influent line is hydraulically connected to the final chamber of a multi-chamber septic tank. The lower chamber of the process tank 10 contains the return line 23 which is hydraulically connected to the first chamber of a multi-chamber septic tank. The return line 23 returns the excess influent flow to the first chamber of the septic tank. The lower chamber contains the enclosed air lift pump 17. The enclosed air lift pump pumps permeate in the collection pipe 29. The air lift pump 17 is pneumatically connected to the air lift pump airline 22. The enclosed air lift pump 17 is hydraulically connected to the bottom of the collection pipe 29. The bubble diffuser 16 is pneumatically connected to the airline for the bubble diffuser 21. The bubble diffuser 16 is mounted on top of the air lift pump 17 and it surrounds the collection pipe 29. The air lift pump 17 combined with the bubble diffuser 16 forms the base of the collection pipe 29. The base has a low profile to diminish the overall height of the lower unit. The spiral wound membrane filter with triangular open channel spacers separating the membrane leaves 14 is mounted above the bubble diffuser 16 and is hydraulically connected to the collection pipe 29. The triangular open channel spacers 34 facilitate the flow of the bubbles created by the bubble diffuser 16 to improve the scrubbing of the outside of the membrane leaves 33. The influent is filtered by the filter 14 and permeate is collected in the collection pipe 29. The water level of the influent is above the top of the filter so that the weight of the water forces the water through the filter 14 and into the collection pipe 29. The skirt 15 is mounted to the base of the filter 14. The skirt 15 directs the bubbles created by the bubble diffuser 16 into the base of the filter 14 to scour the outside of the filter membrane leaves 33. The lower chamber contains the process tank drain pipe 13. The drain pipe 13 is mounted into the upper chamber of the process tank 32 and extends downward until it is just short of the bottom of the process tank 10. The process tank drain pipe 13 has a removable cap on the top of the pipe. The water in the lower chamber of the process tank 10 can be pumped out via the drain pipe 13. The lower chamber of process tank 10 contains the union 28 which is hydraulically connected to the collection pipe 29 above the spiral wound membrane filter 14. The union allows the lower assembly to be removed from the process tank 10 for repairs. The collection pipe 29 is hydraulically connected to the collection tank after the union 28.

The watertight upper chamber of the process tank 32 has a removable exterior lid 19 which contains the air vent 18. The air vent 18 is pneumatically connected to the upper chamber of the process tank 32. There are four compartments in the upper chamber 32. The compartments of the process tank upper chamber 32 contain: the low pressure high volume blower 30 and the three-way airline actuator valve 31, the control panel 27, the collection tank with its chemical cleaning port 24, and the collection tank actuator valve 25 and the effluent line 11. The upper chamber 32 also contains and the filter access port with the removable filter access lid 20 and the process tank drain pipe 13. A compartment contains the low pressure high volume blower 30 which supplies air to the bubble diffuser 16 and the enclosed air lift pump 17. The process tank air vent 18 provides air for the blower 30. The three-way airline actuator valve 31 is pneumatically connected to the blower 30, to the bubble diffuser airline 21 and the enclosed air lift pump airline 22. When the blower 30 is operating the airline actuator valve 31 directs air to either the bubble diffuser 16 via bubble diffuser airline 21 or to the air lift pump 17 via air lift pump airline 22. The bubble diffuser airline 21 is pneumatically connected to a quick connect connector in the process tank upper chamber 32. The enclosed air lift pump airline 22 is pneumatically connected to a quick connect connector in process tank upper chamber 32. Another compartment of the upper chamber 32 contains the control panel 27. The control panel 27 is electrically connected to and supplies power to; the blower 30, the airline actuator valve 31, the collection tank actuator valve 25, and the low water level indicator 26. There are manual and automatic controls for the filter device in the control panel 27. The manual controls are on the outside and the automatic controls are on the inside of the control panel 27. Another compartment of the upper chamber 32 contains the collection tank 24. The collection tank 24 has a chemical cleaning fill pipe with a removable cap mounted to the top of the collection tank. The chemical cleaning fill pipe is hydraulically connected to the collection tank. The chemical cleaning fill pipe allows a cleaning solution to be introduced into the system. The collection tank 24 is hydraulically connected to the collection pipe 29 after the union 28. The collection pipe 29 passes through the wall of the compartment containing the collection tank 24 before it connects to the collection tank 24. The collection pipe 29 is connected near the base of the collection tank 24. The final compartment of the upper chamber 32 contains the collection tank actuator valve 25 and the effluent line 11. The collection tank actuator valve is hydraulically connected to the side of the collection tank 24 and is mounted near the bottom of the collection tank 24. The effluent line 11 is hydraulically connected to the collection tank actuator valve 25. The effluent line 11 passes through the exterior wall of its compartment and through the exterior wall of the process tank 10 and is hydraulically connected to a drain field or other method of dispersal.

A lift pump which is controlled by a float switch and an additional float switch which controls an external high water alarm are added to the last chamber of a multi-chamber septic tank. The lift pump pumps water from the final chamber of the septic tank to the process tank. The lift pump is hydraulically connected to the influent line 12. Rising water in the last chamber of a multi-chamber septic tank lifts a float switch which activates the lift pump. The influent pipe 12 contains a siphon break to stop the influent from returning to the final chamber of the septic tank after the lift pump stops pumping. Rising water in the lower chamber of the process tank 10 lifts the low water indicator 26 in the lower chamber of a process tank 10 which initiates the run cycle. The run cycle begins with a backwash of the spiral wound membrane filter 14. A backwash of the filter 14 is initiated when the collection tank actuator valve 25 closes. The airline actuator valve 31 directs the airflow from the blower 30 to the enclosed lift pump 17 via the air lift pump airline 22. The blower 30 turns on and begins pumping air. The enclosed air lift pump 17 pumps permeate from the collection tank 24, the collection pipe 29 and the filter 14 out through the membranes leaves 33 of the filter 14 along with some additional air, cleaning the membrane leaves 33 of filter 14 from the inside. When the backwash is finished the airline actuator valve 31 switches the air flow from the blower 30 to the airline for the bubble diffuser 21 and the bubble diffuser 16. The bubble diffuser 16 makes bubbles which are trapped by the skirt 15 and sent to the base of the spiral wound membrane filter 14. The rising bubbles are channeled by the triangular open channel spacers 34 to clean the membrane leaves 33 of the filter 14 from the outside. After a short period of time the collection tank actuator valve 25 which is hydraulically connected to the collection tank 24 and hydraulically connected the effluent line 11 opens to allow permeate in the collection tank 24 to flow to the effluent line 11 for dispersal. The level of the influent water is above the top of the spiral wound membrane filter 14 and the weight of the influent forces the influent through the membranes of the filter 14 and into the collection pipe 29. The membranes of the filter 14 reduce the amount of fecal coliform bacteria and solids in the filter permeate. The airline actuator valve 31 which receives air from the blower 30 cycles between sending the air to the bubble diffuser 16 via the airline for the bubble diffuser 21 and the enclosed air lift pump 17 via the air lift pump airline 22. When the flow of influent exceeds the rate of flow through the filter 14 the excess water is returned to the first chamber of the septic tank via the return line 23. The run cycle continues until the low water indicator 26 falls which indicates that there is no new influent flowing from the last chamber of a multi-chamber septic tank into the process tank 10.

When the run cycle ends the device returns to the rest mode. The rest mode is on a cycle timer which cycles between two states on and off. When the rest mode is on the blower 30 is sending air via the airline actuator valve 31 to the bubble diffuser 16 via the bubble diffuser airline 21 to scrub the outside of the membranes of the spiral wound membrane filter 14. All of the mechanical components (with the exception of the rest mode timer) of the filter device are inactive when the rest mode is off.

When a manual chemical cleaning is performed. The process tank exterior lid 19 is removed. The collection tank actuator valve 25 is switched closed at the control panel 27 and the filtration device is shut down. The cap is removed from the chemical fill pipe of the collection tank 24. A cleaning solution is added to the chemical fill pipe of the collection tank 24 and afterwards the cap is replaced. The cleaning solution is allowed to sit in the filter device for at least one hour. Afterwards the collection tank actuator valve 25 is opened and the filtration device is then set to run automatically. The exterior lid 19 is reinstalled onto the top of the process tank 10.

If the components that are in the lower chamber of process tank 10 need to be accessed then the exterior lid 19 needs to be removed. The influent water needs to be removed from the lower chamber of the process tank 10 via the process tank drain pipe 13. The filter access lid of the access port 20 is removed. The airlines 21 and 22 are disconnected at their quick connect connectors. The collection pipe 29 will need to be disconnected at the union 28. The collection pipe 29 below the union; the spiral wound membrane filter 14, the skirt 15, the bubble diffuser 16, the bubble diffuser airline 21, the enclosed air lift pump 17, and the enclosed air lift pump airline 22 are removed as one unit.

DESCRIPTION OF ADDITIONAL EMBODIMENTS

In an additional embodiment, an additional tank is added to an existing single chamber septic tank. The additional tank is hydraulically connected to the outflow pipe of the septic tank and acts as an additional chamber for the septic tank. A lift pump with a float switch to control the pump and a float switch to control an exterior high water alarm are placed into the additional tank. Septic tank influent is pumped from the additional tank by the lift pump into the influent line 14 to be filtered by the device. The flow of the influent which exceeds the rate at which the influent is filtered is returned to the septic tank via the return line 22.

In another additional embodiment multiple component filter devices are linked in series to handle larger water flows from a new or existing multi-chamber septic tank.

In another additional embodiment the process tank 10 is replaced with a single chamber tank with a removable lid. The alternative process tank must be tall enough to provide enough influent above the filter 14 to facilitate filtration and meet the codes for the local jurisdiction in which the device is being installed. The alternative process tank contains: the influent line 12, the return line, the collection pipe 29, the union 28, the spiral wound membrane filter 14, the skirt 15, the bubble diffuser 16, the enclosed air lift pump 17, the airline for the bubble diffuser 21, the airline for the air lift pump 22, and the low water indicator 26. An external equipment vault is linked to the alternative process tank. The external equipment vault has a removable lid which contains a pneumatically connected air vent. The external equipment vault contains: the control panel 27, the blower 30, the airline actuator valve 31, the collection tank with an attached cleaning port 24, the collection tank actuator valve 25 and the effluent line 11. The collection pipe 29 after the union 28 extends through the wall of the alternative process tank and is hydraulically connected to the collection tank 24 in the external equipment vault. The low water indicator cord 26 extends through the wall of the alternative process tank and is electrically connected to the control panel 27 in the external equipment vault. The airline for the bubble diffuser 21 is pneumatically connected to a quick connect connector in the alternative process tank and then extends through the wall of the alternative process tank and is pneumatically connected to the airline actuator valve 31 in the external equipment vault. The airline for the air lift pump diffuser 22 is pneumatically connected to a quick connect connector in the alternative process tank and then extends through the wall of the alternative process tank and is pneumatically connected to the airline actuator valve 31 in the external equipment vault. The collection pipe 29 after the union 28 extends through the wall of the alternative process tank and is hydraulically connected to the collection tank 24 inside of the external equipment vault. The effluent line 11 in the external equipment vault extends through the wall of the external equipment vault and is hydraulically connected to a drain field or other method of dispersal.

The invention claimed is:

1. A component filter device to filter the effluent of a septic tank to be added to a new or an existing multi-compartment septic tank, said septic tank comprising two or more compartments, a first compartment which receives influent and a final compartment which releases effluent of the septic tank, for the purpose of the improving the quality of said effluent of the septic tank and sending the filtered effluent to a drain field or other means of disposal, the device comprises:

A. a hydraulic lift pump inserted into said final compartment of said septic tank to pump water contained within the compartment and hydraulically connected to a waterline, B. a watertight single compartment process tank with a removable lid having an influent line hydraulically connected to said water line to receive the water pumped from said septic tank, two airlines, a water return line to return the overflow pumped from said septic tank to the first compartment of the septic tank and an effluent line, C. a spiral wound membrane filter with triangular spacers vertically mounted within said process tank, to filter the water inside of said process tank, D. a collection pipe vertically mounted within said process tank hydraulically connected to said filter and extending through said filter above and below said filter to convey filtrate from said filter, E. a skirt is installed below and attached to the outside of said filter, F. a bubble diffuser pneumatically connected to one of said airlines and installed inside said process tank below said skirt such that bubbles created by the bubble diffuser are directed to said filter by the skirt to scour the filter, G. an airlift pump to pump the filtrate of said filter hydraulically connected to said collection pipe, mounted below said bubble diffuser, pneumatically connected to one of said airlines which is not connected to the bubble diffuser, H. a union hydraulically connected to said collection pipe above said filter to facilitate the removal of the filter and hydraulically connected to said effluent line, I. a low water indicator installed inside said process tank to control the operation of the component filter device, J. an external equipment vault with a removable lid to allow access to the equipment contained within the vault contains: (i) an air vent to supply air to equipment contained within said vault, said effluent line to supply filtrate to said drain field entering and exiting the vault, and (ii) said two airlines to supply air to said airlift pump and to said bubble diffuser, K. a blower to supply air to said bubble diffuser and airlift pump is installed inside of said external equipment vault, L. a three way actuator valve to control the air flow produced by said blower to either said air lift pump or said bubble diffuser is pneumatically connected to the blower and is pneumatically connected to the two said airlines, M. an electronic control panel to supply electrical power to the device and to control the operation of the device is installed inside said equipment vault, N. a collection tank with a hydraulically connected chemical cleaning port is installed inside said equipment vault and is hydraulically connected to said effluent line such that the effluent line enters the collection tank and the effluent line exits the collection tank, and
O. an actuator valve to facilitate the backwash of said filter is mounted inside of said equipment vault, is hydraulically connected to said effluent line after the effluent line exits said collection tank and before the effluent line exits said equipment vault.

* * * * *